(12) United States Patent
Jasinski

(10) Patent No.: US 7,235,890 B1
(45) Date of Patent: Jun. 26, 2007

(54) METHOD AND SYSTEM FOR PROVIDING POWER FOR A MOVABLE SCANNER HEAD IN PAPER SCANNER

(75) Inventor: Wojtek Ted Jasinski, Burnaby (CA)

(73) Assignee: Honeywell International Inc., Morristown, NJ (US)

( * ) Notice: Subject to any disclaimer, the term of this patent is extended or adjusted under 35 U.S.C. 154(b) by 57 days.

(21) Appl. No.: 11/314,440

(22) Filed: Dec. 21, 2005

(51) Int. Cl.
*H02P 9/04* (2006.01)
(52) U.S. Cl. .................. 290/1 R; 290/1 A; 290/45
(58) Field of Classification Search ............ 290/1 R, 290/1 A, 1 C, 4 R, 4 C, 45; 346/76; 400/74, 400/120
See application file for complete search history.

(56) References Cited

U.S. PATENT DOCUMENTS

| 2,532,799 | A | * | 12/1950 | Young ..................... 358/491 |
| 4,445,798 | A | * | 5/1984 | Munehiro ................. 400/320 |
| 4,699,531 | A | * | 10/1987 | Ulinski et al. ............ 400/74 |
| 6,354,208 | B1 | * | 3/2002 | Bos et al. ............... 101/463.1 |
| 2004/0222638 | A1 | * | 11/2004 | Bednyak ................... 290/1 R |

\* cited by examiner

*Primary Examiner*—Nicholas Ponomarenko
(74) *Attorney, Agent, or Firm*—Munck Butrus P.C.

(57) ABSTRACT

A method for providing electrical power for scanner heads in a paper scanner includes generating electrical power from the movement of the scanner heads and providing at least a portion of the electrical power to the scanner heads. The scanner heads are operational using the provided electrical power.

20 Claims, 2 Drawing Sheets

METHOD AND SYSTEM FOR PROVIDING POWER FOR A MOVABLE SCANNER HEAD IN PAPER SCANNER

TECHNICAL FIELD

This disclosure relates generally to power generation and more specifically to a method and system for providing power for a movable scanner head in a paper scanner.

BACKGROUND

Scanners generally need to provide power to moving scanner heads within the paper scanners. Typically, conventional scanners provide this power to the moving scanner heads through the use of wires that run in power tracks on the scanners. However, problems associated with this method of providing power to the moving paper heads include a relatively high failure rate for the power tracks, the relatively high expense of power tracks, and a drag on mechanical power created by the power tracks. In addition, this method includes EMI problems that are associated with the use of long wires and signal noise problems.

SUMMARY

This disclosure provides a method and system for providing power for a movable scanner head in a paper scanner.

In a first embodiment, a method includes generating electrical power based on movement of scanner heads in a paper scanner and providing at least a portion of the electrical power to the scanner heads.

In particular embodiments, paper sensors in the scanner heads are powered without a wire connection to a static frame of the paper scanner.

In other particular embodiments, the electrical power is generated based on movement of the scanner heads by, for each scanner head, rotating a gear coupled to the scanner head and to a frame of the scanner with the movement of the scanner head.

In a second embodiment, a method includes operating a scanner head in a scanner. A coupling device is moved with the operation of the scanner head, and electrical power is generated with an electric generator based on the movement of the coupling device.

In a third embodiment, a system includes a scanner head that comprises a generator. The scanner head is operable to move in order to obtain properties of a piece of paper. The generator is operable to generate electrical power based on movement of the scanner head and to provide at least a portion of the electrical power to the scanner head.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
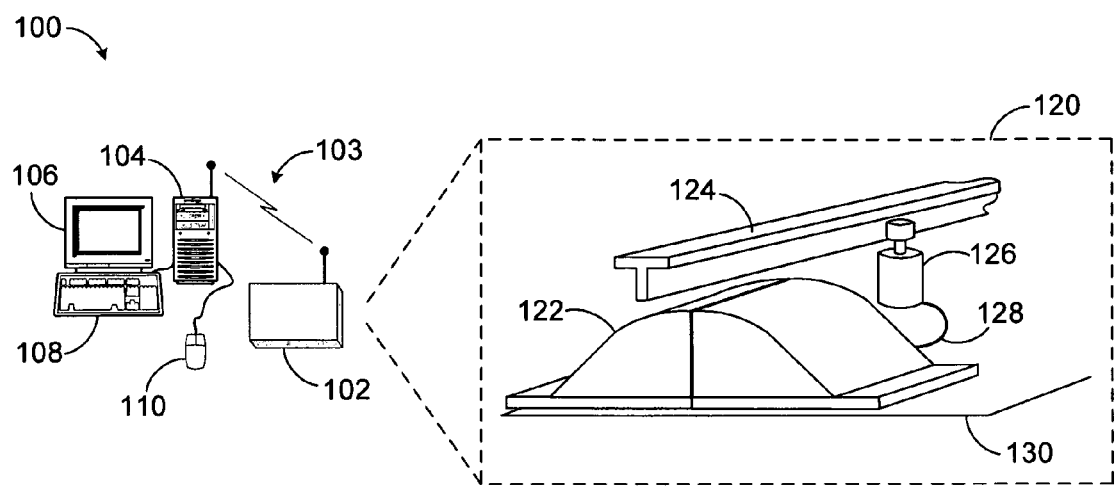
FIG. 1 illustrates an example of a wireless system including a scanner capable of providing power for scanner heads in the scanner from mechanical power of the scanner heads' movement according to one embodiment of this disclosure.

FIG. 1 illustrates an example of a wireless system 100 in which the electrical power provided to sensors located in scanner heads in a scanner 102 is generated from mechanical power of the scanner heads' movement according to the embodiment of this disclosure. The wireless system 100 is operable to control the operation of the scanner 102 via a wireless data link 103. Once the scanner heads are in motion, the system 100 is capable of generating electrical power to sensors located in the movable scanner heads according to one embodiment of this disclosure.

The embodiment of the wireless system 100 shown in FIG. 1 is for illustration only. Other embodiments of the wireless system 100 may be used without departing from the scope of this disclosure. In addition, FIG. 1 illustrates one operational environment in which the scanner 102 may be used. However, it will be understood that the scanner 102 may be used in any other suitable device or system.

In this example embodiment, the wireless system 100 comprises a personal computer 104, with a monitor 106, a keyboard 108 and a mouse 110, in addition to the scanner 102. It will be understood that the wireless system 100 may comprise other or additional components without departing from the scope of the present disclosure.

The scanner 102 is operable to scan paper properties, such as paper moisture, paper thickness, and the like, for a paper 130 that is moving between scanner heads 122. The scanner 102 is also operable to store the scanned properties in the computer 104 and to display them on the monitor 106.

For a particular embodiment, a portion 120 of the scanner 102 may comprise a movable upper scanner head 122, an upper scanner frame 124, a generator 126 and wires 128. The upper scanner head 122 is operable to move across paper 130 or other suitable material in order to obtain the properties of the paper 130. As described in more detail below, the scanner 102 provides for the generation of electrical power from mechanical movement of the upper scanner head 122 without using wire connections between the static upper scanner frame 124 and the movable upper scanner head 122. The system 100 is capable of providing all or a portion of the generated electrical power to sensors located in the movable upper scanner head 122 as depicted in FIG. 1.

The generator 126, which is mounted to the movable upper scanner head 122, is coupled mechanically to the scanner frame 124 via a coupling device such as a gear and is operable to convert mechanical power to electrical power. Electrical power is connected via the wires 128 to a power converter (not shown in FIG. 1), which regulates the voltage and charges a battery (also not shown in FIG. 1) located in the movable upper scanner head 122. For a particular embodiment, the generator 126 may comprise a dynamo-electric machine or other suitable device capable of generating electrical power from the mechanical movement of the scanner head 122. For example, for a particular embodiment, the generator 126 may comprise a gear that is operable to be rotated when the scanner head 122 moves across the piece of paper 130. The rotation of the gear is then operable to pass mechanical power to the electric generator 126, which is capable of generating electrical power.

In this embodiment, the wireless data link 103 is provided to eliminate all wire connections between the upper scanner frame 124 and the movable upper scanner head 122. Thus, all electrical connections between the scanner head 122 and the scanner 102 itself are eliminated, with only air and water hoses connected to the scanner head 122. As a result, power tracks are not used, and the problems associated with the use of power tracks are resolved.

Figure 2:
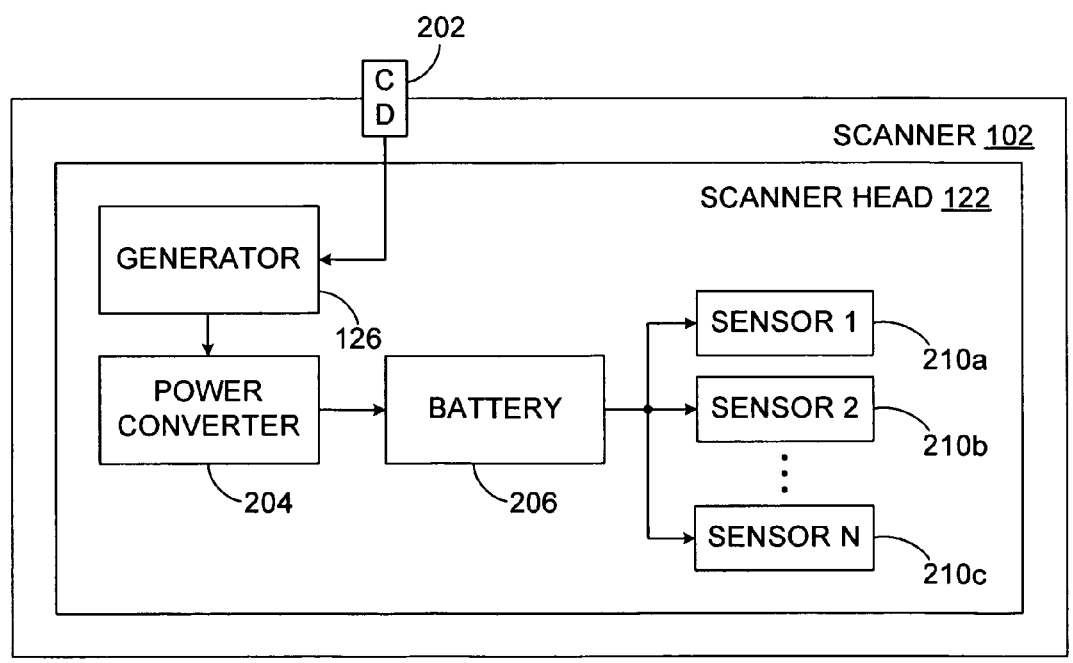
FIG. 2 illustrates details of a portion of the scanner of FIG. 1 according to one embodiment of this disclosure.

FIG. 2 illustrates details of a portion of the scanner 102 according to one embodiment of this disclosure. The embodiment of the portion shown in FIG. 2 is for illustration only. Other embodiments could be used without departing from the scope of this disclosure.

In this example embodiment, the illustrated portion of the scanner 102 comprises, in addition to the scanner head 122 and the generator 126, a power converter 204 and a battery 206. In addition, the scanner head 122 comprises a plurality of sensors 210a-c.

The mechanical power provided by the movement of the scanner head 122 is coupled to the generator 126 via a coupling device (CD) 202, such as a gear. The electrical power generated by the generator 126 is fed to the power converter 204, which is operable to regulate the voltage and charge the battery 206. Electrical power from the battery 206 is used to power the sensors 210a-c located in the scanner head 122.

Figure 3:
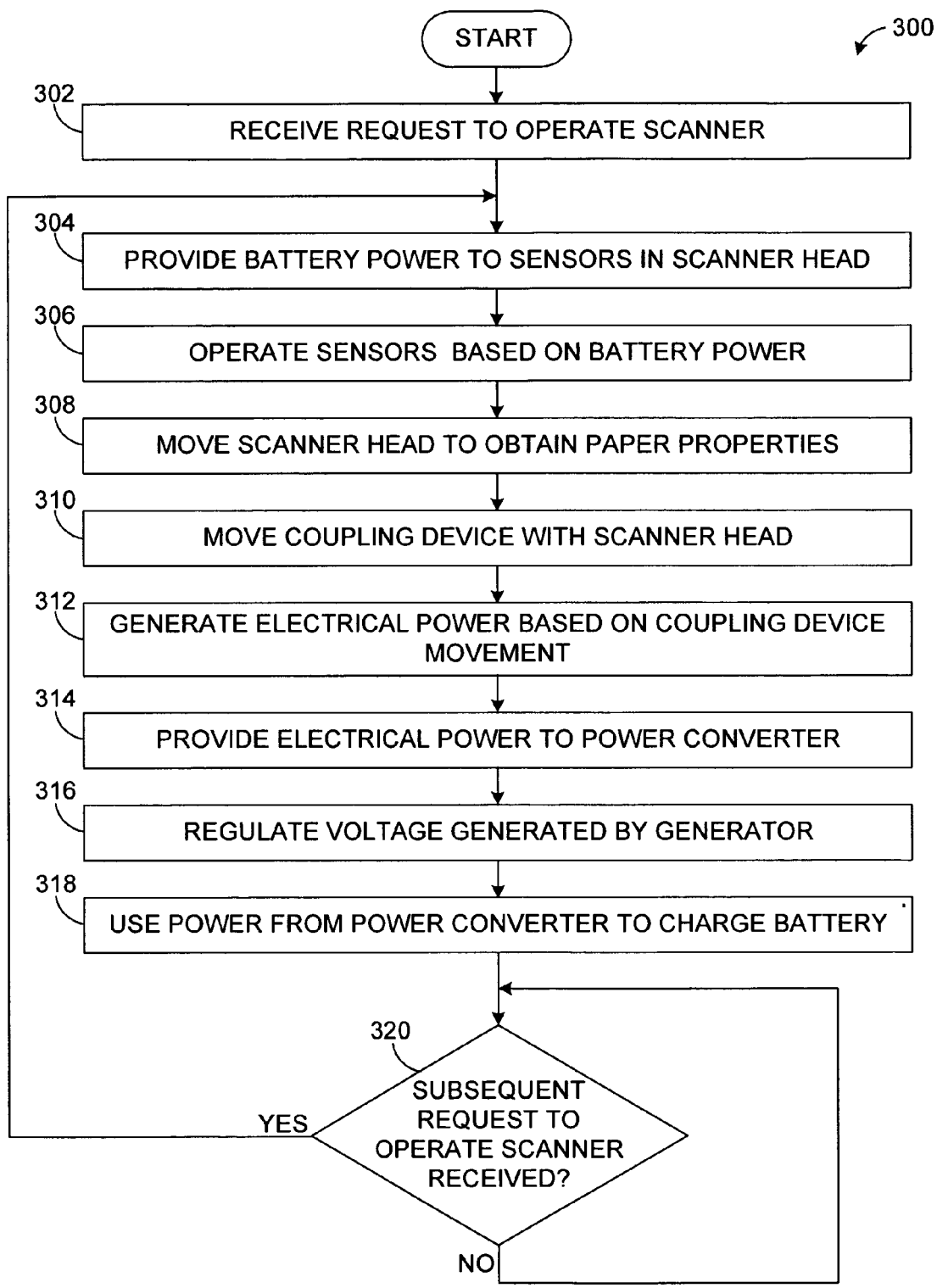
FIG. 3 illustrates an example of a method for providing electrical power to sensors located in the movable scanner head of FIG. 1 or 2 according to one embodiment of this disclosure.

FIG. 3 illustrates an example of a method 300 for providing power for the scanner head 122 in the scanner 102 according to one embodiment of this disclosure. The method 300 may be performed in the scanner 102 used in the wireless system 100 of FIG. 1 or in any other scanner used in any other system. In addition, although described with respect to the upper scanner head 122, it will be understood that the method 300 may be performed for each scanner head of the scanner 102.

A request to operate the scanner 102 is received at step 302. For example, a user of the computer 104 of FIG. 1 may initiate the operation of the scanner 102, causing the computer 104 to send a signal to the scanner 102 over the wireless data link 103 initiating operation. The battery 206 provides power to the sensors 210 in the scanner head 122 at step 304.

Based on the power provided by the battery 206, the sensors 210 start to operate at step 306. As the upper scanner head 122 moves to obtain paper properties at step 308, a coupling device 202, such as a gear or other suitable component, is moved by the movement of the upper scanner head 122 at step 310.

Electrical power is generated in the generator 126 from the movement of the coupling device 202 at step 312. The generator 126 provides electrical power to the power converter 204 at step 314. The power converter 204 regulates the voltage generated by the generator 126 at step 316. The power from the power converter 204 is then used to charge the battery 206 at step 318. The power generated during one scan is sufficient to power the sensors 210 between subsequent scanner moves. This allows the scanner sensors 210 to operate on a continuous basis.

At this point, a determination is made regarding whether a subsequent request to operate the scanner 102 has been received at step 320. Once a subsequent request to operate the scanner 102 is received, the battery 206 again provides power to the sensors 210 at step 304 and the method continues as described above.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
generating electrical power based on movement of scanner heads in a paper scanner; and
providing at least a portion of the electrical power to the scanner heads.

2. The method of claim 1, further comprising powering sensors in the scanner heads without a wire connection between the scanner heads and a static frame of the paper scanner.

3. The method of claim 1, generating the electrical power based on movement of the scanner heads comprising, for each scanner head, rotating a gear coupled to the scanner head and to a frame of the paper scanner with the movement of the scanner head.

4. The method of claim 1, generating the electrical power comprising, for each scanner head, generating the electrical power using an electrical generator coupled to the scanner head and coupled to a frame of the paper scanner.

5. The method of claim 4, the electrical generator comprising a dynamoelectric machine.

6. The method of claim 1, providing at least a portion of the electrical power to the scanner heads comprising providing at least a portion of the electrical power to a battery and powering sensors in each scanner head from the battery.

7. A method, comprising:
operating a scanner head in a scanner;
moving a coupling device with the operation of the scanner head; and
generating electrical power with an electric generator based on the movement of the coupling device.

8. The method of claim 7, further comprising providing the electrical power for use in subsequently operating the scanner head.

9. The method of claim 7, further comprising:
providing battery power from a battery to at least one sensor in the scanner head;

operating the sensor based on the battery power; and operating the scanner head comprising operating the scanner head based on the operation of the sensor.

10. The method of claim 9, further comprising:

providing the electrical power to a power converter; and regulating a voltage of the electrical power and charging the battery with the power converter.

11. The method of claim 7, the coupling device comprising a gear.

12. The method of claim 7, generating the electrical power comprising generating the electrical power with a dynamo-electric machine.

13. An apparatus, comprising a scanner head in a scanner, the scanner head operable to move to obtain properties of a piece of paper, the scanner head comprising a generator operable to generate electrical power based on movement of the scanner head and to provide at least a portion of the electrical power to the scanner head.

14. The apparatus of claim 13, the scanner head operable to move based on the electrical power provided by the generator.

15. The apparatus of claim 13, the generator comprising a coupling device coupled to the scanner head, the generator operable to generate the electrical power based on movement of the coupling device.

16. The apparatus of claim 15, the coupling device comprising a gear, the gear operable to be rotated with the movement of the scanner head, the generator operable to generate the electrical power based on movement of the coupling device by generating the electrical power based on the rotation of the gear.

17. The apparatus of claim 13, the generator comprising a dynamoelectric machine.

18. The apparatus of claim 13, further comprising a battery coupled to the generator, the battery operable to receive at least a portion of the electrical power from the generator and to provide battery power based on the electrical power to the scanner head.

19. The apparatus of claim 13, further comprising a power converter coupled to the generator, the power converter operable to receive at least a portion of the electrical power and to regulate a voltage of the received electrical power.

20. The apparatus of claim 19, the scanner head comprising at least one sensor, the apparatus further comprising:

a battery coupled to the power converter, the power converter further operable to charge the battery based on the received electrical power, the battery operable to provide battery power to the sensor;

the sensor operable to operate based on the battery power; and the scanner head operable to move based on the operation of the sensor.

* * * * *